Oct. 9, 1923.
J. M. WEYANDT ET AL
ARTIFICIAL PLANT
Filed Aug. 3, 1922
1,470,516
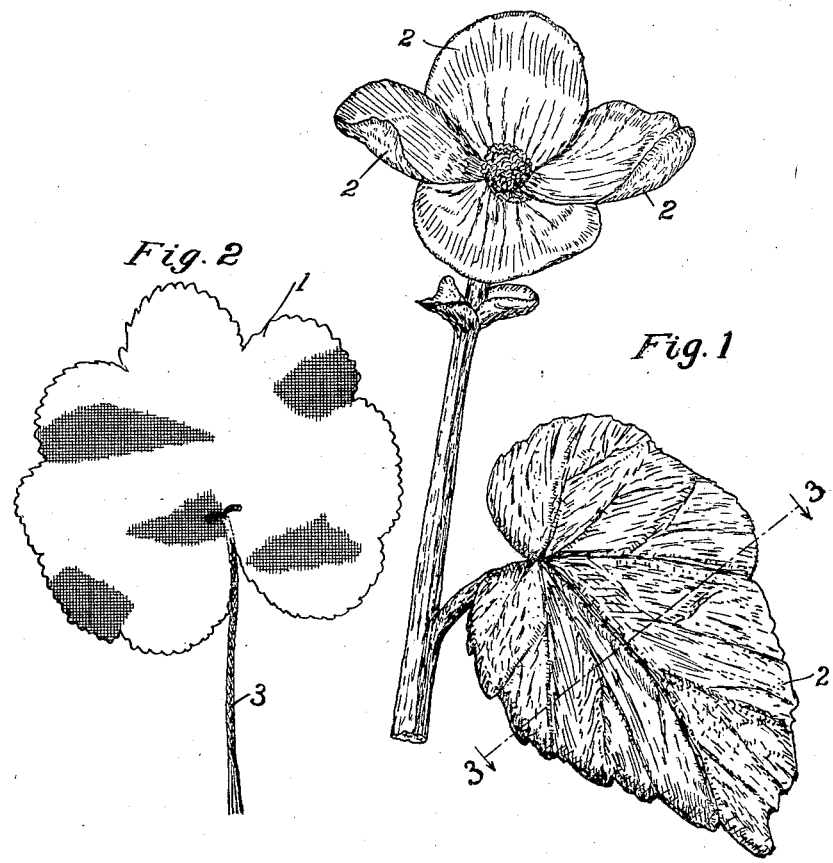
WITNESSES
F. R. Walker
INVENTORS
Jennie M. Weyandt
Mary Tafarella
BY
ATTORNEYS Patented Oct. 9, 1923.

1,470,516

UNITED STATES PATENT OFFICE.

JENNIE MARIE WEYANDT AND MARY TAFARELLA, OF CLEVELAND, OHIO.

ARTIFICIAL PLANT.

Application filed August 3, 1922. Serial No. 579,513.

*To all whom it may concern:*

Be it known that we, JENNIE M. WEYANDT and MARY TAFARELLA, citizens of the United States, and residents of Cleveland, in the county of Cuyahoga and State of Ohio, have invented a new and Improved Artificial Plant, of which the following is a full, clear, and exact description.

This invention relates to improvements in artificial plants, and more particularly to artificial flowers, leaves, vines, or any other plant life, an object of the invention being to provide an artificial plant which shall be to all intents and purposes indestructible, so that it may be used for outdoor decoration, and will maintain its shape, configuration and design regardless of the weather, and which will simulate the appearance of the original plant life so that the difference can be detected only by close inspection.

A further object is to provide an artificial plant in which the petals of the flowers, the leaves, etc., have a body of perforated indestructible material preferably of copper or brass wire cloth, which not only permits the paint or other covering to bind on the surfaces and interlock by reason of the fact that the material will pass through the perforations of the body, but also permits a ready bending of the article into the desired shape, and will function to maintain the shape and also resist the attacks of wind and weather conditions which have an effect of destroying or materially injuring artificial plants such as heretofore made.

A further object is to provide an artificial plant which will be extremely artistic when finished, which can be manufactured and sold at a reasonably low price, and which lends itself to floral and plant decoration without limit.

With these and other objects in view, the invention consists in certain novel features of construction and combinations, and arrangement of parts, as will be more fully hereinafter described and pointed out in the claims.

In the accompanying drawings—

Figure 1 is a perspective view illustrating our invention as applied to a flowering plant showing both the flower and the leaf.

Figure 2 is a plan view illustrating a body portion of a leaf before it is covered and ornamented and before it is bent.

Figure 3 is an exaggerated section on the line 3—3, of Figure 1.

In carrying out our invention either in the formation of floral petals or leaves, we provide a body portion 1 which is preferably of brass or copper wire cloth, or other weather resisting indestructible bendable material, and while we illustrate in Figure 2 the body portion of a leaf, it is to be understood that this same idea of indestructible body portion is to be used in connection with the formation of leaves, petals, or other parts of the artificial plant, and the description of the formation of the leaf is equally applicable to the formation of other parts of the artificial plant.

This body portion 1 is cut or otherwise shaped with proper outline, in accordance with the leaf or petal to be formed, and is then bent into the desired shape to give the proper surface configuration to the leaf. It is then covered on both sides with a paint composition 2 to give the necessary color to the article, as well as give the necessary body to the article, and this composition 2 not only covers both surfaces of the body 1 but also passes through the perforations of the body and thus serves to lock or key the surfacing material together.

Such an arrangement lends itself to a wide range of artistic coloring and ornamentation, and it is to be understood that the covering material 2 may be made as thin or as thick as desired, and the ornamentation may be completed to suit the artist in order to represent effectually the leaf or petal being represented.

The invention is of course, not limited to the particular manner of forming the stem of the leaf, or other portion of the plant, but a simple and efficient form of construction is illustrated in Figure 2 in which an ordinary picture wire 3 made up of strands as is customary, is projected through the body portion 1, the strands then being divided and projected laterally and again through the body portion 1, and then twisted about the main portion of the wire.

The formation of the stalks or stems of the plant, may be of any material either solid or hollow, and may be covered and coated and ornamented in any way to give the desired results; but in any case it is to be understood that this invention applies particularly to artificial plant life for outdoor use and is to be made for all practical purposes indestructible.

While we have throughout the specification laid particular stress upon the use of wire mesh material as the body of the leaf, petal, or other portion of the plant, we would have it understood that the invention covers broadly the use of any analogous weather resisting material, whether it be perforated or not, and which may be cast, stamped or shaped in any desired manner so that the result is a flower or plant or combination of both for outdoor use, which is weather resisting and which will maintain its shape and permit decoration so as to simulate the flower or the plant and take the place of the natural flowers and plants for this use.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

We claim:

1. As a new article of manufacture, an artificial plant having portions thereof composed of a foraminated metallic body, and an ornamental covering on all faces of said body.

2. As a new article of manufacture, an artificial plant, comprising a body portion of perforated weather resisting bendable material, and an ornamental covering inclosing said body portion and extending through the perforations thereof.

3. An artificial leaf, comprising a body portion of wire mesh, and an ornamental covering inclosing the body portion and interlocking through the mesh.

4. An artificial leaf, comprising a perforated body portion, a coating on the body portion, and a stem composed of wire strands, said stem projected through the body portion and having certain strands returned through the body portion and wound around the main portion of the wire.

JENNIE MARIE WEYANDT.
MARY TAFARELLA.